Feb. 9, 1965     T. J. GIAMPA     3,168,967
BEVERAGE DISPENSER

Filed Oct. 3, 1961     2 Sheets-Sheet 1

TONY J. GIAMPA
INVENTOR.

BY *Lyon+Lyon*

ATTORNEYS.

Feb. 9, 1965 T. J. GIAMPA 3,168,967
BEVERAGE DISPENSER
Filed Oct. 3, 1961 2 Sheets-Sheet 2

TONY J. GIAMPA
INVENTOR.

BY *Lyon + Lyon*

ATTORNEYS.

United States Patent Office 3,168,967
Patented Feb. 9, 1965

3,168,967
BEVERAGE DISPENSER
Tony J. Giampa, 2970 W. Bellevue Ave.,
Los Angeles, Calif.
Filed Oct. 3, 1961, Ser. No. 142,564
5 Claims. (Cl. 222—129.1)

This invention relates to a device for dispensing various beverages and, in particular, is directed to a portable, hand faucet apparatus capable of dispensing various fluids and automatically mixing some of these fluids within the hand faucet.

In the marketing of beverages over the counter in open containers or the like, such as in restaurants, soda fountains or bars, there are usually a number of beverages to be dispensed. In some establishments, it is common practice to open individual bottles of each beverage provided or possibly to have one beverage capable of being dispensed from a faucet on a counter mounted reservoir. The opening of individual bottles for each beverage has been found to be very time consuming, and has led to the counter mounted reservoir type dispenser. This type dispenser, however, is relatively inconvenient as well as being objectionable in appearance and size in many installations.

Other installations employ counter mounted faucets for dispensing beverages which are provided with reservoirs containing the beverages placed beneath the counter and subjected to sufficient internal pressure to force the beverage up to the faucet for dispensing. This type of installation has the disadvantage that a separate faucet is necessary for each beverage and a certain amount of reaching and side movement from faucet to faucet is necessary as different beverages are dispensed. The inconvenience of such counter mounted faucets has led to the development of portable hand faucets connected by a hose to the pressurized beverage-containing reservoir and the operator need only to pick up the faucet of the desired beverage and actuate the valve contained therein as the faucet is moved from glass to glass. This portable hand faucet type installation has also been found to have the disadvantage that an individual faucet is necessary for each beverage dispensed.

There have been various commercial attempts to provide a single hand faucet with a number of beverages being dispensed from the single faucet. The versatility has generally been limited to three beverages and, as such, only partially solves the problem they are intended to obviate since usually more than three beverages are being dispensed. Further, these multiple beverage hand faucets are commonly operated by an individual button on the faucet for each beverage which, when depressed, electrically actuates a valve located remote from the faucet such as on the pressurized beverage reservoir. This remote placement of the valve with respect to the hand faucet results in a relatively large quantity of the beverage remaining in the line between the valve and the faucet. This beverage may dribble out of the faucet when the faucet is placed on the counter or elsewhere when not in use. Also, if the beverage being dispensed is carbonated, such as soda water, Coca-Cola, 7 Up or the like, then the beverage will lose a certain amount of the carbonation while it is in the hose between the valve and the hand faucet. One of the multiple beverages may remain in this portion of the hose for an extended time, thereby becoming flat and unsatisfactory for consumption. The remote electrical operation has also been found to require excessive maintenance to assure proper operation.

Further, since the remote valves in such an installation are operated by electrical switches in the hand faucet there is constantly the possibility that the operator will receive an electrical shock. This has been found particularly true due to the usually wet condition of the operator's hands and the surrounding area. The hand faucet may carelessly be left in the ice bin or sink which over a period of time causes malfunctions of the switches as well as electrical shocks to the operator. The cost of installation, maintenance and repair parts has been found prohibitive for many situations.

Accordingly, it is an object of this invention to provide a novel beverage-dispensing device which is provided with a hand faucet capable of being moved about and capable of selectively dispensing various beverages.

Another object of this invention is to provide a beverage dispensing device with a highly portable hand faucet which is capable of selectively dispensing various beverages by the mere actuation of means provided in the hand faucet.

A further object of this invention is to provide a relatively inexpensive hand faucet for dispensing various beverages contained in pressurized reservoirs where in the valves for emitting the beverages are contained in the hand faucet and are selectively operable by manual manipulation at the faucet.

Another object of this invention is to provide a portable hand faucet for dispensing various beverages wherein some beverages are contained in pressurized reservoirs and dispensed directly from the faucet and other beverages are mixed at the faucet from syrup contained in a pressurized reservoir and charged water contained in a separate pressurized reservoir.

A further object of this invention is to provide a portable hand faucet for dispensing beverages wherein the valves for emitting the beverages are contained in the hand faucet and the beverages are neither mixed nor exposed to atmospheric pressure prior to their actual dispensing into a container for consumption.

Another and more detailed object of this invention is to provide a hand faucet for dispensing various beverages wherein only a single element on the faucet need be manually manipulated to dispense a single beverage even though that beverage be a mixture of two fluids supplied individually to the hand faucet under pressure.

Other and more detailed objects and advantages of this invention will appear from the following description and the accompanying drawings.

Figure 1:
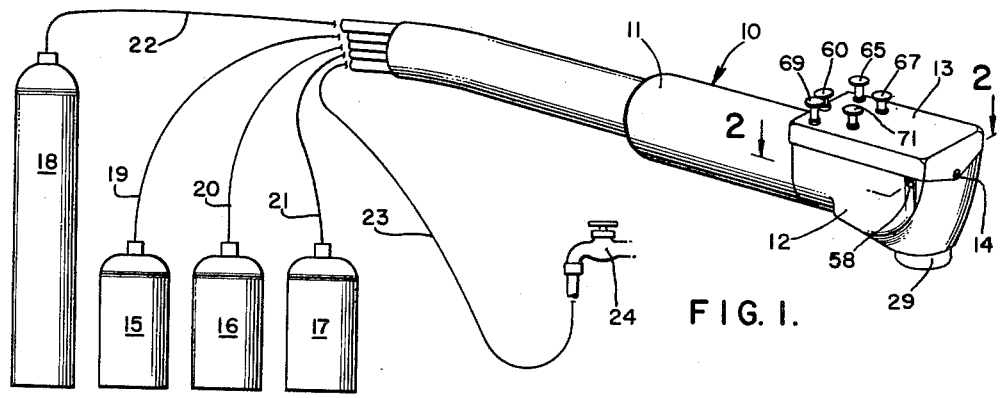
FIGURE 1 is a perspective view of the apparatus of this invention together with a diagrammatic illustration of the devices supplying the various fluids to the apparatus.

Referring now to the drawings, the device of this invention is generally designated 10 and comprises the hand faucet for dispensing the desired beverages. A generally cylindrical sleeve 11 serves as a gripping handle of the device and is secured to the housing, generally designated 12, by any convenient means. A cover 13 is removably secured to the housing 12 by screw 14.

In the device illustrated I have shown an apparatus for dispensing five different types of beverages from the faucet 10, but it is to be understood that by mere duplication of the appropriate parts shown, additional beverages could be dispensed in the same manner. In dispensing such beverages as Coca-Cola, 7 Up or ginger ale, a syrup containing the particular flavor is mixed with carbonated or charged water to produce the consumable beverage. In FIGURE 1, I have shown three reservoirs 15, 16 and 17 for containing three different flavored syrups. The carbonated or charged water is contained in the reservoir 18. Conduits 19, 20, 21 and 22 are connected to reservoirs 15, 16, 17 and 18, respectively, and lead to the dispensing faucet 10. The length and size of these conduits 19, 20, 21 and 22 depend on the distance of the faucet 10 from the location of the reservoirs. In addition, a conduit 23 may be attached to a fresh water tap 24 for supplying fresh water to the faucet 10 for dispensing. The conduits 19, 20, 21, 22 and 23 may be of any appropriate material to withstand the pressures involved for each liquid and at least the last several feet of each conduit which is adjacent the faucet 10 should be of a relatively flexible material to permit ease of movement by hand of the dispensing faucet 10. The pressures necessary within reservoirs 15, 16, 17 and 18 and at the tap 24 will depend on the length and size of the conduits 19, 20, 21, 22 and 23. It has been found that in installations using normal placement of the reservoirs and normal access to a fresh water tap, the size and length of conduits 19 through 23 are such that the syrups in reservoirs 15, 16 and 17 need to be under a pressure of 7 to 15 lbs. per square inch and the carbonated water in reservoir 18 needs to be under a pressure of 80 to 110 lbs. per square inch to achieve satisfactory flow. Water at a pressure of 35 to 45 lbs. per square inch at the tap 24 is usually satisfactory.

In order to support the various valves and moving parts and to accommodate the necessary passages to and from the valves, the housing 12 is provided and as illustrated is a solid member with the appropriate passages and openings machined therein. It is to be understood that the housing 12 could be in the form of a shell member with the valve bodies and tubing appropriately supported therein for accomplishing the required valving and fluid flow. The handle end of the housing 12 is provided with appropriate tubular projections 25 for receiving the ends of the conduits 19, 20, 21, 22 and 23. The conduits are secured to the projections 25 by any appropriates means and the means used will depend on the pressure to which that conduit is subjected as set forth above.

Figure 3:
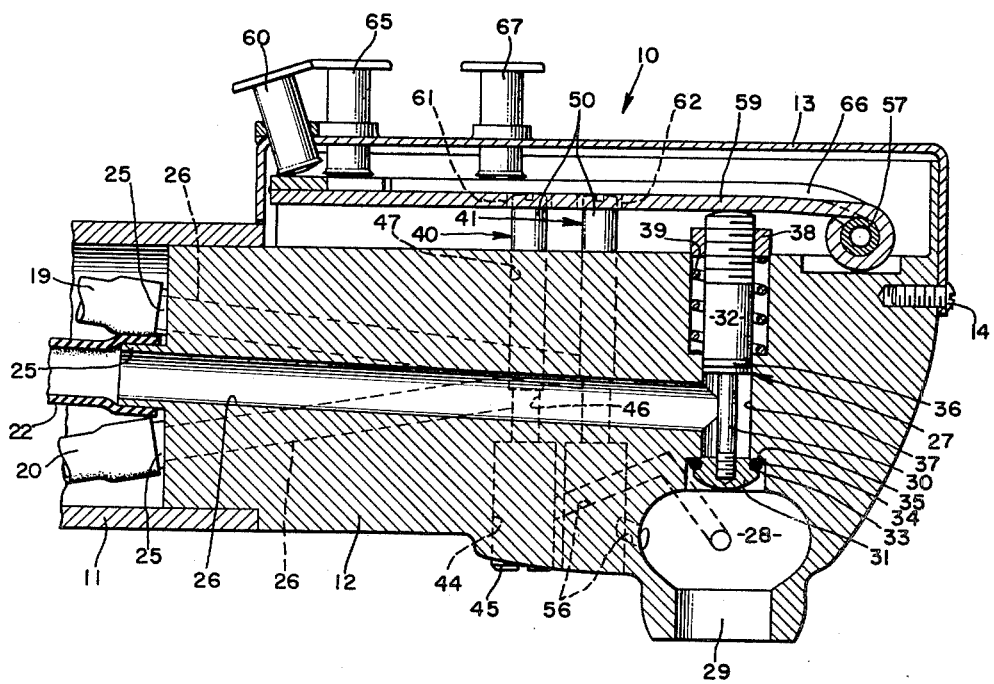
FIGURE 3 is a sectional elevation of the apparatus taken substantially on the line 3—3 as shown in FIGURE 2.

An inlet passage 26 is bored from each projection 25 to the appropriate valve. The internal diameter of each bore is determined by the fluid to be carried by that passage 26. For example, as shown in FIGURE 3, the central inlet passage 26 which leads from conduit 22 is larger than the bores of the two other passages 26 illustrated by dotted lines which lead from conduits 19 and 20. This is appropriate since the conduits 19 and 20 carry syrup whereas conduit 22 carries carbonated water and the final mixed beverage of syrup and carbonated water contains a great deal more of the carbonated water than the syrup.

The carbonated water valve, generally designated 27, is positioned in the housing 12 directly over a mixing chamber 28 which in turn communicates with the nozzle 29 where the beverages are dispensed. Although the carbonated water valve 27 could be positioned elsewhere, I prefer the positioning illustrated in order to achieve a more direct mixing with syrups and discharging of the carbonated water through the nozzle 29. The valve 27 may be constructed in any convenient manner and, as illustrated in the drawings, this construction may include a stem 30 threadedly connected to a head 31 and integrally joined to a body portion 32. The head 31 is provided with an appropriate groove 33 for receiving an O-ring 34 adapted to seat against an annular surface 35 in the housing 12 to seal off the flow of carbonated water from the passage 26. The body portion 32 is provided with a groove for receiving an O-ring 36 adapted to seal against the vertical bore 37 to prevent leakage of the carbonated water upwardly through the bore 37. The upper end of body portion 32 is threaded and threadedly receives sleeve 38 for permitting adjustment of the compression of coil spring 39. Coil spring serves to seat O-ring 34 against the surface 35 with sufficient force to withstand the pressure of the carbonated water.

Figure 4:
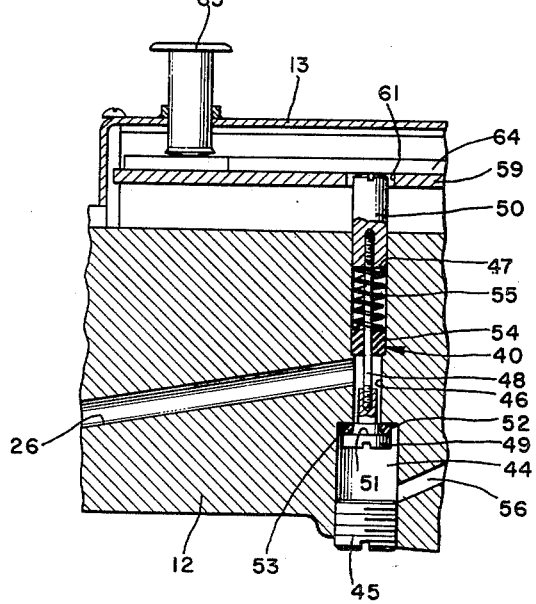
FIGURE 4 is a fragmentary sectional elevation taken substantially on the line 4—4 as shown in FIGURE 2, and is a typical illustration of the valves used in the apparatus.

Each of the syrup metering valves, generally designated 40, 41 and 42, and the fresh water valve, generally designated 43, may be similarly constructed and this construction may take the form illustrated for valve 40 as shown in FIGURE 4. The housing 12 is provided with a chamber 44 having a metering screw 45 threadedly received in the lower end of the chamber, a bore 46 communicating with the inlet passage 26 and chamber 44, and a bore 47 larger than and extending upwardly from bore 46. A stem 48 is threadedly attached on its lower end to a head 49 and threadedly attached on its upper end to a plunger 50. The head 49 is provided with a groove 51 for receiving an O-ring 52 adapted to seat against the annular surface 53 in the housing 12. An annular sleeve 54 composed of an appropriate packing material is positioned in the lower end of the bore 47. This sleeve 54 makes sealing contact with the bore 47 and the stem 48 to prevent the upward passage of fluid from the bore 46 to the bore 47. A coil spring 55 extends between the plunger 50 and the sleeve 54 to maintain the valve in a normally closed position, that is, with the O-ring 52 sealed against the surface 53.

An outlet passage 56 leads from the chamber 44 of each valve 40, 41, 42 and 43 to the mixing chamber 28. The metering screw 45 which is threadedly received in the chamber 44 may be adjusted so as to partially close off the opening to the passage 56 thereby limiting the rate of flow of fluid from the passage 26 past the opened valve and through outlet passage 56. By the proper adjustment of the metering screw 45, the proper proportional mixture of syrup and charged water is obtained in the mixing chamber 28 for dispensing into an appropriate container.

Means are provided for actuating the valves 27, 40, 41, 42 and 43 and, as shown in the drawings, these means may include a plurality of levers pivotally mounted in the housing. Each of the valves is opened by downwardly depressing the upper end of the valve. A pivot shaft 57 is mounted horizontally in the housing by any convenient means such as screws 58 on either side of the housing. A lever 59 for operating the carbonated water valve 27 is provided and centrally positioned on the shaft 57. The lever 59 is free to turn about the shaft 57 and downward movement (or counterclockwise turning as viewed in FIGURE 3) of lever 59 serves to force the body portion 32 of the valve 27 downwardly to open that valve and emit carbonated water. A button 60 is movably mounted in the cover 13 for applying a downward force to cause the downward movement of the lever 59. The lever 59 is provided with apertures 61 and 62 to permit downward movement of the lever 59 without actuating the valves 40 and 41, respectively. A relieved portion 63 is also provided in the lever 59 to permit the downward movement of the lever without actuating valves 42 and 43.

A second lever 64 is pivotally mounted on the shaft 57 and extends over the top of and in contacting relationship with the upper end of the valve 40. The button 65 is movably mounted in the cover 13 and engages the lever 64 such that downward movement of button 65 causes downward movement of the lever 64 and plunger 50 of the valve 40, thereby opening the valve to emit syrup to the mixture chamber 28. Part of the lever 64 is superimposed over a portion of the lever 59 so that downward movement of lever 64 causes like downward movement of the lever 59, thereby also actuating the carbonated water valve 27 to emit carbonated water to the mixing chamber 28 for mixing and dispensing the desired beverage.

A third lever 66 is provided and pivotally mounted on the shaft 57. Lever 66 extends over the valve 41 to actuate that valve upon downward movement of the lever. A button 67 is movably mounted in the cover 13 and is positioned directly over the lever 66 whereby downward movement of the button 67 causes downward movement of the lever 66 and opening of the valve 41. A portion of the lever 66 extends over the lever 59 so that the downward movement of lever 66 to open valve 41 causes downward movement of lever 59 to also open valve 27. The syrup emitted from valve 41 and the charged water emitted from valve 27 are mixed in the mixing chamber 28 for dispensing to the appropriate container.

A fourth lever 68 extends over the top of valve 42 and is partially superimposed upon the lever 59 so that downward movement of the button 69 causes downward movement of lever 68 and like downward movement of lever 59 thereby causing the opening of valves 42 and 27 similar to the simultaneous opening of two valves as previously described for the mixing of carbonated water and a syrup.

Figure 2:
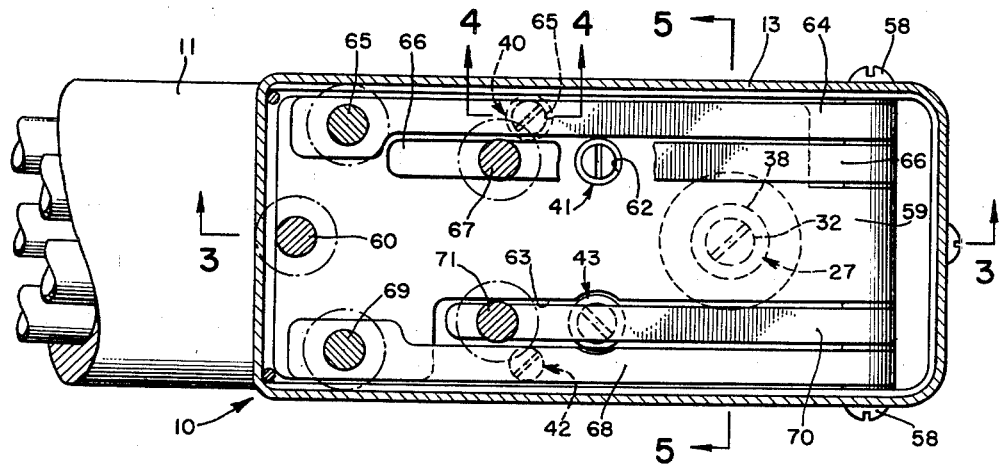
FIGURE 2 is a sectional plan view of the apparatus of this invention taken substantially on the line 2—2 as shown in FIGURE 1.
Figure 5:
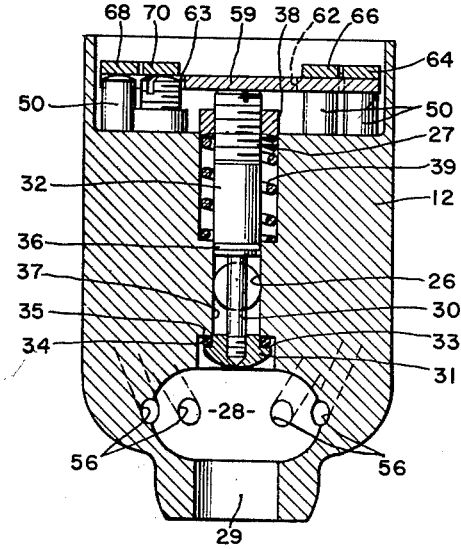
FIGURE 5 is a sectional elevation taken substantially on the line 5—5 as shown in FIGURE 2.

A lever 70 is pivotally mounted on the shaft 57 and extends over the upper end of the valve 43 for actuating that valve upon downward movement of that lever. A button 71 is movably mounted in the cover 13 and is positioned directly above the lever 70 such that downward movement of buttom 71 causes opening of valve 43. As shown in FIGURE 2, lever 70 has no portion extending over lever 59 and therefore the fluid emitted by valve 43 is not mixed with fluid normally emitted by valve 27. The fluid supplied to valve 43 through passage 26 may therefore be any beverage that does not need mixing and in the specific application illustrated by FIGURE 1, this valve 43 would communicate with conduit 23 to serve as the fresh water dispensing valve.

The relative positioning of the buttons 60, 65, 67, 69 and 71 with respect to the valves operated by these buttons is such that a mechanical advantage is obtained, thereby making the opening of the valves by depressing the buttons physically easier than if each button was positioned directly over the appropriate valves. Further, the carbonated water valve 27 which is subjected to the greatest pressure is positioned closer to the pivot shaft 57 than any of the other valves and the button 60 is positioned further away from the pivot 57 than the other buttons so that the greatest mechanical advantage is obtained for the operation of the carbonated water valve. The buttons 60, 65, 67, 69 and 71 are so located that by a person gripping the handle 11 between his four fingers and palm he is able to operate any one of the five buttons with the thumb of that hand without aid from the other hand.

Thus it may be seen that a portable hand faucet is provided which is capable of dispensing numerous beverages some of which are mixed within the faucet and which contains all of the valves within the handle that are necessary for emitting the beverages.

Having fully described my invention, it is to be understood that I do not wish to be limited to the details herein set forth or to the details illustrated in the drawings, but my invention is of the full scope of the appended claims.

I claim:

1. In a portable device for selectively dispensing beverages and mixing and dispensing syrups and charged water all supplied to the device under pressure, the combination of: a housing, a plurality of valves mounted in said housing, one of said valves for controlling the flow of each different syrup, one of said valves for controlling the flow of each different beverage, one of said valves for controlling the flow of charged water, a pivot shaft mounted in said housing, a plurality of levers pivotally mounted on said shaft, one of said levers associated with each valve for operating that valve upon turning of that lever about said pivot shaft, each lever associated with one of said syrup control valves adapted to engage the lever associated with said charged water control valve for turning the latter said lever upon turning of a lever associated with a syrup control valve, a mixing chamber in said housing having an oval shape and a restricted outlet, the said valve for controlling the flow of charged water positioned adjacent said mixing chamber and directly opposite said restricted outlet, said valve for controlling the flow of charged water having means for causing the charged water to flow in contact with the entire surface of said mixing chamber, a passage extending between said mixing chamber and each of said valves for controlling different syrups and different beverages, each of the said passageways extending between the chamber and the valves controlling the flow of beverage syrup opening into said mixing chamber on the major diameter portions of the oval surface thereof between the charged water valve and said restricted outlet, and a plurality of actuating means movably mounted in said housing, one of said actuating means for each said lever for causing turning of that said lever.

2. The combination of claim 1 wherein means are provided for adjustably and selectively restricting the size of each of said passages connecting said mixing chamber with a said valve for controlling the flow of beverage syrup.

3. In a portable device for selectively dispensing beverages and mixing and dispensing syrups and charged water all supplied to the device under pressure, the combination of: a housing, a plurality of valves mounted in said housing, one of said valves for controlling the flow of each different syrup, one of said valves for controlling the flow of each different bevearge, one of said valves for controlling the flow of charged water, a pivot shaft mounted in said housing, a plurality of levers pivotally mounted on said shaft, one of said levers associated with each valve for operating that valve upon turning of that lever about said pivot shaft, each lever associated with one of said syrup control valves adapted to engage the lever associated with said charged water control valve for turning the latter said lever upon turning of a lever associated with a syrup control valve, a mixing chamber in said housing having an oval shape and a restricted outlet, the said valve for controlling the flow of charged water positioned adjacent said mixing chamber and directly opposite said restricted outlet, the said valve for controlling the flow of charged water having a flanged head for extending into said mixing chamber upon opening of said valve for causing outward flow of the charged water toward and into contact with the entire oval surface of said mixing chamber, a passage extending between said mixing chamber and each of said valves for controlling different syrups and different beverages, each of the said passageways extending between the chamber and the valves controlling the flow of beverage syrup opening into said mixing chamber on the major diameter portions of the oval surface thereof between the charged water valve and said restricted outlet, and a plurality of actuating means movably mounted in said housing, one of said actuating means for each said lever for causing turning of that said lever.

4. In a portable device for selectively dispensing a plurality of different syrups and mixing such syrups with charged water all supplied to the device under pressure, the combination of: a housing, a separate valve mounted in said housing for controlling the flow of each of the plural different syrups, a charged water valve mounted in said housing for controlling the flow of charged water, plural lever means mounted in said housing for selectively operating each of said syrup valves, means for operating said charged water valve upon actuation of one of said lever means for operating a selected syrup valve, a mixing chamber in said housing having an oval shape and a restricted outlet, said charged water valve communicating directly with said mixing chamber remote from said restricted outlet, means for causing the charged water to flow in contact with substantially the entire oval surface of said mixing chamber upon opening of said charged water valve, and passages extending between said mixing chamber and each of said syrup valves, each said passage opening into said mixing chamber on the major diameter portions of the oval surface thereof between the charged water inlet and the said restricted outlet.

5. In a portable device for selectively dispensing a plurality of different syrups and mixing such syrups with charged water all supplied to the device under pressure, the combination of: a housing, a separate valve mounted in said housing for controlling the flow of each of the plural different syrups, a charged water valve mounted in said housing for controlling the flow of charged water, plural lever means mounted in said housing for selectively operating each of said syrup valves, means for operating said charged water valve upon actuation of one of said lever means for operating a selected syrup valve, said means for operating said charged water valve synchronized with said plural lever means for dispensing charged water subsequent to the completion of dispensing of a syrup, a mixing chamber in said housing having an oval shape and a restricted outlet, said charged water valve communicating directly with said mixing chamber remote from said restricted outlet, means for causing the charged water to flow in contact with substantially the entire oval surface of said mixing chamber upon opening of said charged water valve, and passages extending between said mixing chamber and each of said syrup valves, each said passage opening into said mixing chamber on the major diameter portions of the oval surface thereof between the charged water inlet and the said restricted outlet, said subsequent dispensing of charged water serving to cleanse the said mixing chamber of dispensed syrup at the completion of each dispensing.

References Cited by the Examiner
UNITED STATES PATENTS

| | | | |
|---|---|---|---|
| 1,627,147 | 5/27 | Clark | 222—144.5 |
| 1,947,329 | 2/34 | Buttner. | |
| 2,887,250 | 5/59 | Zilk | 222—145 X |
| 2,937,792 | 5/60 | Firstenberg | 222—144.5 |
| 3,009,653 | 11/61 | Hedeman | 222—144.5 X |

RAPHAEL M. LUPO, *Primary Examiner.*

LAVERNE D. GEIGER, *Examiner.*